United States Patent
Rakshit et al.

(10) Patent No.: US 11,307,825 B1
(45) Date of Patent: Apr. 19, 2022

(54) RECORDING A SEPARATED SOUND FROM A SOUND STREAM MIXTURE ON A PERSONAL DEVICE

(71) Applicant: International Business Machines Corporation, Armonk, NY (US)

(72) Inventors: Sarbajit K. Rakshit, Kolkata (IN); Manish Anand Bhide, Hyderabad (IN); Seema Nagar, Bangalore (IN); Madhavi Katari, Telangana (IN); Kuntal Dey, Rampurhat (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/187,868

(22) Filed: Feb. 28, 2021

(51) Int. Cl.
*G06F 3/04817* (2022.01)
*G06F 3/16* (2006.01)
*G10L 25/51* (2013.01)
*G06F 3/0484* (2022.01)

(52) U.S. Cl.
CPC .......... *G06F 3/165* (2013.01); *G06F 3/0484* (2013.01); *G06F 3/04817* (2013.01); *G10L 25/51* (2013.01)

(58) Field of Classification Search
CPC .......... G06F 3/165; G06F 3/167; G06F 16/58; G06F 16/7867; G06F 3/162; G06F 16/68; G06F 16/683; G06F 16/686; G06F 3/0484; G06F 21/31; G06F 21/44; G06F 3/14; G01N 2291/2693; G01N 29/14; G01N 29/4436; G01N 29/4454; G01N 29/449;

(Continued)

(56) References Cited

U.S. PATENT DOCUMENTS 8,831,255 B2   9/2014   Crawford
10,031,718 B2  7/2018   Dack
(Continued)

FOREIGN PATENT DOCUMENTS

KR   101641672 B1    7/2016
KR   20190067289 A   6/2019

OTHER PUBLICATIONS

Fohl et al., "A FPGA-Based Adaptive Noise Cancelling System", Proc. of the 12th Int. Conference on Digital Audio Effects (DAFx-09), Como, Italy, Sep. 1-4, 2009, <http://dafx09.como.polimi.it/proceedings/papers/paper_19.pdf>.

(Continued)

*Primary Examiner* — Rayeez R Chowdhury
(74) *Attorney, Agent, or Firm* — David K. Mattheis; Maeve M. Carpenter (57) ABSTRACT

The method provides for one or more processor receiving on a personal device, a mixture of sounds within a sound stream from multiple sources. The one or more processors identifying one or more sounds of the mixture of sounds from the multiple sources, based on a sound separation technique. The one or more processors displaying on a user interface of the personal device an icon corresponding respectively to a classification of the one or more sounds identified from the multiple sources. The one or more processors receiving a selection of a sound from the mixture of the multiple sounds, based on an action by a user of the personal device selecting the icon displayed on the user interface of the personal device, and the one or more processors recording the sound from the mixture of the multiple sounds selected by the user.

20 Claims, 4 Drawing Sheets

(58) Field of Classification Search
CPC ......... G01N 29/46; G01N 2291/02881; G01N 29/024; G01N 33/2823
See application file for complete search history.

(56) References Cited

U.S. PATENT DOCUMENTS

| | | |
|---|---|---|
| 2009/0254829 A1* | 10/2009 | Rohde .................... G11B 27/34 715/727 |
| 2013/0236040 A1 | 9/2013 | Crawford |
| 2015/0025662 A1* | 1/2015 | Di Censo ................ G06F 3/165 700/94 |
| 2015/0373474 A1 | 12/2015 | Kraft |
| 2016/0269712 A1 | 9/2016 | Ostrover |
| 2018/0204416 A1 | 7/2018 | Perea-Ochoa |

OTHER PUBLICATIONS

Mc Dermott et al., "Recovering sound sources from embedded repetition", 1188-1193 | PNAS | Jan. 18, 2011 | vol. 108 | No. 3, <https://www.pnas.org/content/108/3/1188.short>.

Mc Gill et al., "Acoustic Transparency and the Changing Soundscape of Auditory Mixed Reality", CHI 2020, Apr. 25-30, 2020, Honolulu, HI, 16 pps., <https://dl.acm.org/doi/fullHtml/10.1145/3313831.3376702#BibPLXBIB0017>.

Valimaki et al., "Assisted Listening Using a Headset: Enhancing audio perception in real, augmented, and virtual environments", Article in IEEE Signal Processing Magazine Mar. 2015, DOI: 10.1109/MSP.2014.2369191, 21 pps., <https://ieeexplore.ieee.org/document/7038251/>.

* cited by examiner

RECORDING A SEPARATED SOUND FROM A SOUND STREAM MIXTURE ON A PERSONAL DEVICE

FIELD OF THE INVENTION

The present invention relates generally to the field of sound source recording, and more particularly to separating sound sources of interest for selection to record.

BACKGROUND OF THE INVENTION

Many environments include multiple sounds sources, which seem to integrate and blend into an aggregate stream of indistinguishable sound. Aggregate sound streams can be found indoors, such as at large social gatherings with multiple simultaneous conversations ongoing. Outdoor aggregate sounds streams can also be found and can include combinations of natural sounds, such as wind, birds, rain, combined with man-made sounds, such as people playing, talking, and automobiles traveling. The multiple sound sources may seem to merge into an integrated background sound.

Identification of sound sources and sounds, in general, are affected by emitting of multiple simultaneous sounds. Determining the position of a sound source in three dimensions: azimuth, height, and distance. It is based on 3 types of cues: two binaural (interaural time difference and interaural level difference) and one monaural spectral cue (head-related transfer function). Sound localization is based on binaural cues (interaural differences), or differences in the sounds that arrive at the two detectors, such as one's ears, or dual microphones (i.e., differences in either the time of arrival or the intensity of the sounds at the right and left ears), or on monaural spectral cues (e.g., the frequency-dependent pattern of sound).

Augmented reality glasses are often used to include features and functions applied to a view of real surroundings. In some cases, augmented reality glasses can add images or indicators to a viewing screen that appears in addition to the view of surroundings in the direction the augmented reality (AR) glasses are directed. In other cases, the AR glasses include information associated with the direction of view of the surroundings, which may be in the form of text, symbols, or playing of audio.

SUMMARY

Embodiments of the present invention disclose a method, computer program product, and system for selectively recording one or more sounds separated from a multiple-sound environment. The method provides for one or more processor receiving on a personal device, a mixture of sounds within a sound stream from multiple sources. The one or more processors identifying one or more sounds of the mixture of sounds from multiple sources, based on a sound separation technique. The one or more processors displaying on a user interface of the personal device an icon corresponding respectively to a classification of the one or more sounds identified from the multiple sources. The one or more processors receiving a selection of a sound from the mixture of the multiple sounds, based on an action by a user of the AR glasses selecting the icon displayed on the user interface of the personal device, and the one or more processors recording the sound from the mixture of the multiple sounds selected by the user.

DETAILED DESCRIPTION

Embodiments of the present invention recognize that sounds from various sources may be emitted simultaneously and present difficulty in identifying and distinguishing one sound of a source from other sounds from other respective sources. Embodiments further recognize the difficulty in determining the direction and proximity of sounds emitted together, such as a bird's song, multiple vehicle-sounds, human voices, and natural sounds such as wind and rain. Embodiments also recognize that sound localization can be determined, and sound separation can be achieved by applying a repeating pattern, temporal regularity, and time-frequency decomposition techniques and algorithms, which focus on the inconsistency of feature configurations within sound mixtures.

Embodiments of the present invention provide a method, computer program product, and computer system for determining the localization of detected sound sources forming a mixture of sounds and enable separation and recording of a user-selected sound on a personal device. In some embodiments, the personal device is a pair of augmented reality (AR) glasses, configured with two or more microphones, wireless network connection, and resources to execute a sound selection program. In other embodiments, the personal device may be a smartphone or other smart device configured to receive a sound stream of a mixture of sounds and capable of operating the sound selection program.

In some embodiments, the detected mixture of sounds is separated and classified into categories represented by icons that are displayed to the user of the personal device. The user selects an icon representing a sound type and source and can listen to as well as record the selected sound. In some embodiments, a new recording can be made by adding a live separated sound selected for recording on a previously recorded sound. In some embodiments, the user of the personal device, configured to separate sound and present the distinct sound sources on a display of the personal device, alters the properties of one or more sounds to be recorded, which may include attributes such as adjusting the volume of the sound or changing the pitch of the sound. The control of recording parameters is selectable from the personal device. In some embodiments in which a collaborative broadcast is received by multiple users, each user can select distinct sounds from the broadcast on respective personal devices and record the selected sounds. In yet other embodiments, the user of the personal device is presented with icons in preferential positions representing sounds of interest to the user, based on interest history or direct input by the user.

In embodiments of the present invention, two or more microphones of the personal device receive a sound stream that includes multiple sounds from distinct sources. The sounds are separated using enabling sound selection techniques and algorithms, such as time-frequency offset decomposition and temporal regularities of sound repetition. The separated sounds are classified into categories that are established by training an artificial intelligence (AI) model, utilizing machine learning. The training includes applying supervised learning techniques of individual sounds and clustering similar sounds into a category of classification. In some embodiments, a category may further drill down to one or more sublevels of categories. The categories of separated sounds include a corresponding icon, which is presented to the user on the display component of the user's personal device, such as the display screen of a smartphone, the display on the inner portion of AR glasses, or the display of a smartwatch, for example.

In some embodiments, the display of icons includes a directional indicator of the sound source. In other embodiments, the relative distance may be indicated by the length of the directional indicator, for example. The direction of the separated sound is determined by the time-delay measurement of received sound between separated microphones. In some embodiments, an auxiliary array of microphones may be connected to the personal device to improve the accuracy of sound localization detection of direction and distance.

In embodiments of the present invention, a user of the personal device views the icons of the separated sounds on the display and selects a sound to record by performing an action selecting the icon associated with the sound. The selection action for AR glasses as a personal device may include detecting the eye focus direction towards an icon displayed on the inner surface of the AR glass display and performing a pattern of blinking. Optionally, the selection action for AR glasses may be a hand gesture directed to the position of the selected sound icon as displayed in the AR glasses display. In some embodiments, the user is presented with options for recording properties of the selected sound. For example, the user may select to augment the volume attribute of the selected sound, or if multiple selected sounds are being recorded, the user may enhance one separated sound volume and diminish the volume of the other recorded sounds.

Figure 1:
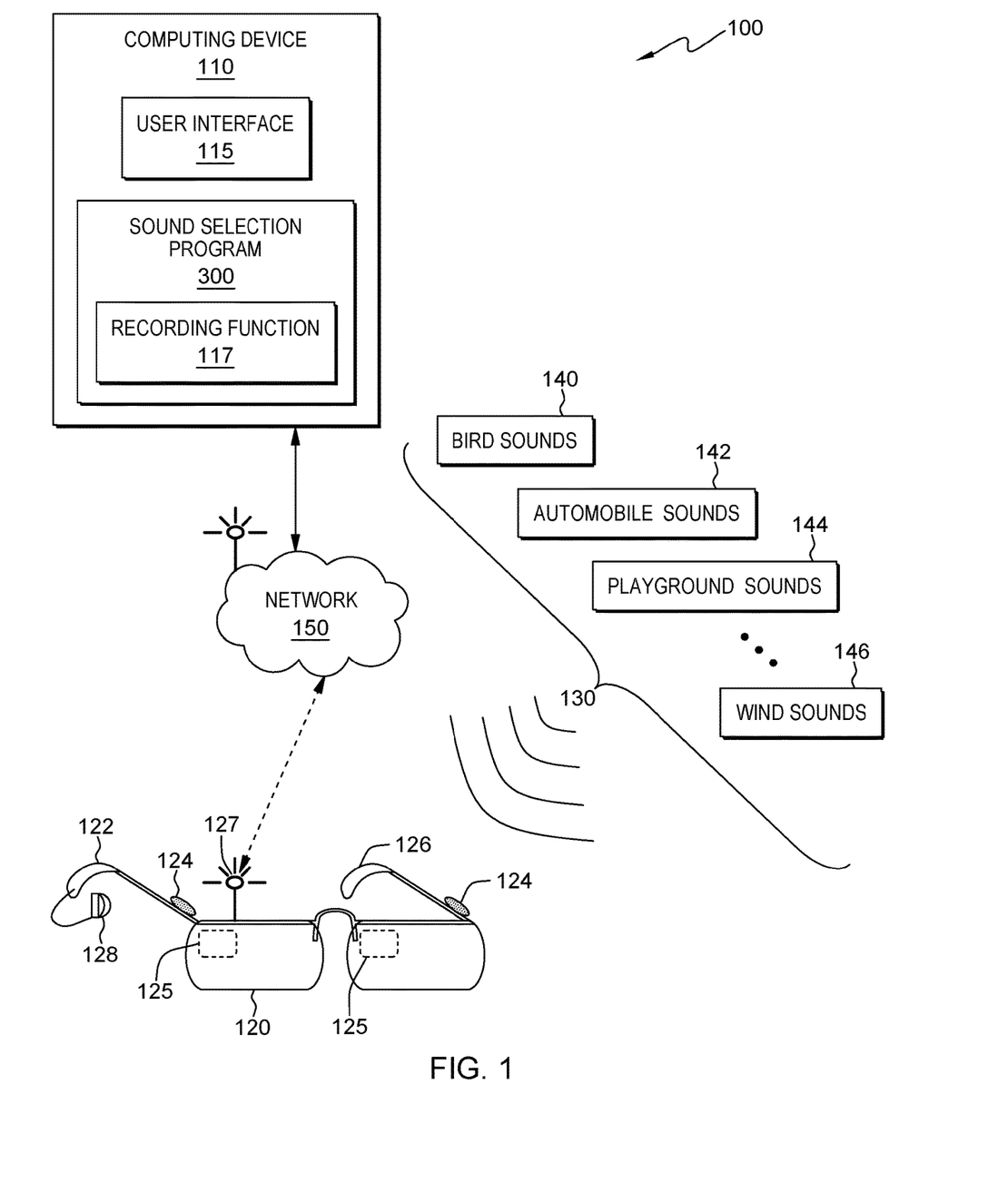
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed computer processing environment 100 includes computing device 110 and augmented reality (AR) glasses 120, interconnected via network 150. Distributed computer processing environment 100 also includes sound mixture 130 representing a sound stream that contains a mixture of sounds from multiple sound sources as a sound stream. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission.

Computing device 110 includes user interface 115 and sound selection program 300, which is further depicted as including recording function 117. In some embodiments, computing device 110 is a separate device communicatively connected to AR glasses 120 via network 150 (as depicted in FIG. 1) and provides sound selection and recording functions as well as memory storage. In other embodiments, computing device 110 is an integral component of AR glasses 120 (not shown).

In some embodiments, the computing device 110 can be a blade server, a web server, a laptop computer, a desktop computer, a standalone mobile computing device, a smartphone, a tablet computer, or another electronic device or computing system capable of receiving, sending, and processing data. In other embodiments, computing device 110 may be a wearable item or included in a wearable item of a user, such as AR glasses. In still other embodiments, computing device 110 may be a computing device interacting with applications and services hosted and operating in a cloud computing environment. In another embodiment, the computing device 110 can be a netbook computer, a personal digital assistant (PDA), or other programmable electronic devices capable of receiving data from and communicating with other devices (shown and not shown) in distributed computer processing environment 100, via network 150, as well as performing operations of resource prediction program 300. Alternatively, in some embodiments, computing device 110 may be communicatively connected to sound selection program 300, operating remotely. Computing device 110 may include internal and external hardware components, depicted in more detail in FIG. 4.

User interface 115 provides an interface to access the features and functions of computing device 110. In some embodiments of the present invention, user interface 115 provides access to operate and select options for sound selection program 300 and may also support initiating and selecting an option for recording function 117 or other applications, features, and functions of computing device 110 (not shown). In some embodiments, user interface 115 provides display output and input functions for computing device 110. In other embodiments, user interface 115 is a component of AR glasses 120, such as display area 125, and provides display output and enables selection of options and functions associated with sound selection program 300 operating on computing device 110.

User interface 115 supports access to alerts, notifications, and provides access to forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of computing device 110. User interface 115 enables respective users of computing device 110 and AR glasses 120 to receive, view, hear, and respond to input, access applications, display content of online conversational exchanges, and perform available functions.

Sound selection program 300 is an application for detecting and selecting one or more sounds of a sound stream that includes a mixture of multiple sounds from multiple sources and recording the selected separated sounds. In embodiments of the present invention, sound selection program 300 operates from a user's personal device that is configured to receive sound input from two or more separated microphones enabling sound direction detection. In some embodiments, the user's personal device may be a properly configured smartphone, including two or more microphones that are positioned to detect sound source direction, such as being located at opposite sides or ends of the smartphone. In other embodiments, the user's personal device is a wearable item, such as AR glasses that include the functional capabilities of computing device 110, and capable of operating sound selection program 300 and recording function 117.

Although FIG. 1 depicts computing device 110 as separate from AR glasses 120, to indicate the role of sound selection program 300 and recording function 117, some embodiments of the present invention recognize that AR glasses 120 include the computer functionality of computing device 110 as well as operationally performing sound selection program 300 and recording function 117. For clarity and simplicity in conveying the features of embodiments of the present invention, the user's personal device will, herein, be referred to by reference to AR glasses, such as AR glasses 120. It is further noted that embodiments of the present invention are not limited to AR glasses as a personal device performing the operational steps of sound selection program 300 and recording function 117.

Sound selection program 300 includes machine learning techniques to recognize and categorize sounds from sources included in a sound stream mixture of multiple sounds. In one embodiment, sound selection program 300 is trained by submitting and identifying multiple sounds of multiple types, and further trained to detect the submitted and identified sounds within a mixture of simultaneous sounds of a sound stream. In some embodiments, the sounds are clustered into a category of sounds, and an icon is associated with respective categories to enable and facilitate the selection of detected sounds. In some embodiments, a category may drill-down to subcategories. Sound selection program 300 receives a sound stream that includes multiple sounds from respective sources. In some embodiments, sound selection program 300 determines the direction of the source of respective sounds and identifies the category of the respective sounds. Sound selection program 300 displays an icon corresponding to the category of a separated sound on the user interface display, such as display area 125 of AR glasses 120. Sound selection program 300 displays the icons and a direction pointer for the detected and separated sounds from the sound stream of multiple sounds.

In some embodiments, sound selection program 300 receives a selection of an icon corresponding to a separated sound from the user of AR glasses 120. In some embodiments, the selection of the icon presents the user with options to confirm the recording of the selected sound and may include options to alter the properties of the sound as it is recorded, such as the attributes of enhancing or diminishing the volume of the sound. In some embodiments, the user selects one or more icons to record simultaneously, including options to alter the properties of the sounds as recorded.

Recording function 117 is a module of sound selection program 300 and provides the functionality to record the selected sound and apply selected properties to the recording. In some embodiments, recording function 117 stores the sound recording and includes functions to recall a previously stored sound recording. In some embodiments, recording function 117 can copy a previously recorded sound as an option presented to the user, and enable mixing of a recording of another sound on the copy of the previously recorded sound. In embodiments in which a broadcast that includes a mixture of multiple sounds is received by a plurality of users, sound selection program 300 enables respective users to select and record distinct sounds from the multi-sound mixture broadcast.

AR glasses 120 are augmented reality glasses and are depicted with an example configuration that includes power source 122, microphones 124, display areas 125, processing and memory component 126, wireless communication 127, and audio speaker 128. AR glasses are depicted as being wirelessly communicatively connected to computing device 110. In some embodiments, the computing functionality, sound selection program 300, and recording function 117 are included in AR glasses 120 (not shown). In some embodiments, AR glasses 120 includes and operates sound selection program 300, displaying icons of detected sounds from a sound stream of a mixture of sounds on display area 125. In some embodiments, the user of AR glasses 120 selects an icon corresponding to a classification of a detected sound by directing eye focus on an icon displayed in display area 125 and performing a blinking action detected by a camera feature of AR glasses 120 (not shown). In other embodiments, the user of AR glasses 120 selects an icon displayed in display area 125 by performing a hand gesture aligning with the display of the selected icon.

Power source 122 is a component of AR glasses 120, depicted by example as an earpiece of AR glasses 120. Power source 122 provides power to the processing and display features of AR glasses 120. Microphones 124 are depicted as a pair of microphones positioned on opposite temple-arms of AR glasses 120. Microphones 124 receive a sound stream that may include a mixture of sounds from multiple sources. Microphones 124 are positioned to enable the determination of a direction of a sound source. Memory component 126 is depicted as an example of a component of AR glasses 120 that includes primary volatile memory and storage memory for storing recorded selected sounds. Memory component 126 supports the processing of sounds from a sound stream received through microphones 124 and operation of sound selection program 300. In some embodiments in which AR glasses 120 is separate from, but communicatively connected to computing device 110, wireless communications 127 enables wireless connection of AR glasses 120 to computing device 110 via network 150. Audio speaker 128 provides an audio output to the user of AR glasses 120 of sounds processed by sound selection program 300, which are separated and delivered to audio speaker 128, based on a selection made by the user.

Sound mixture 130 is a sound stream that includes a mixture of multiple sounds from multiple respective sources. Sound mixture 130 is depicted as comprising a mixture of bird sounds 140, automobile sounds 142, playground sounds 144, and additional sounds including wind sounds 146. Sound mixture 130 is received by microphones 124 of AR glasses 120 and processed by sound selection program 300 to present icons corresponding to separated sounds from sound mixture 130 for selection by the user of AR glasses 120.

Figure 2:
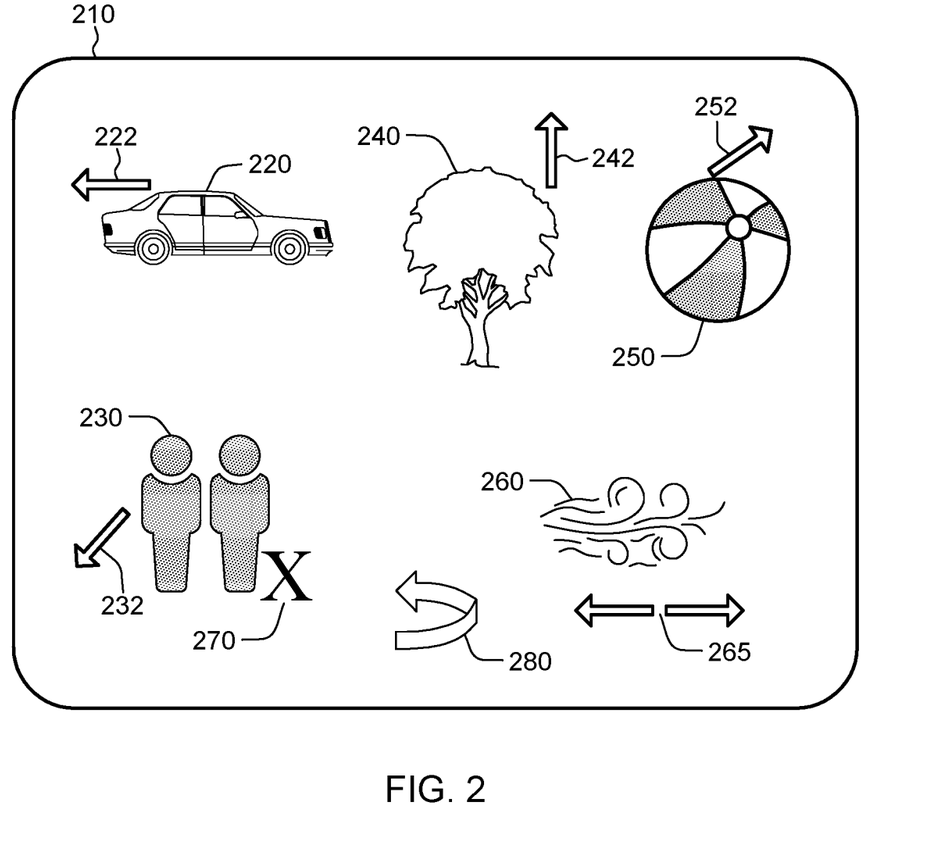
FIG. 2 depicts an example of sound category icons displayed in an area of a user's personal device, in accordance with an embodiment of the present invention.

FIG. 2 depicts an example of sound category icons displayed in an area of a user's personal device, in accordance with an embodiment of the present invention. FIG. 2 includes display area 210, vehicle icon 220 and corresponding direction pointer 222, people icon 230 and direction pointer 232, nature icon 240 and direction pointer 242, playground icon 250 and direction pointer 252, wind icon 260 and direction pointer 262, and selection indicator 270. Each icon in display area 210 represents an identified sound separated from a mixture of sounds in a sound stream received by a user's personal device, such as AR glasses 120 (FIG. 1). Each corresponding direction pointer indicates the detected direction of the sound source.

The icons displayed on display area 210 represent a category of sounds and, in some embodiments of the present invention, are assigned during the training of sound selection program 300. The sound stream example represented by icons displayed in display area 210 includes sounds from automobile traffic detected in the direction of direction pointer 222 and represented by the vehicle icon 220. In some embodiments, sounds emitted from vehicles such as trucks, buses, motorcycles, trains, and bicycles, for example, are represented by vehicle icon 220. Similarly, sounds made by people, which may be speaking, singing, yelling, coughing, and the like are represented by people icon 230, and the detected direction of people sounds is indicated by direction pointer 232. In some embodiments, sounds from various birds, dogs, cats, or other animals are represented by nature icon 240 with the direction of detected sounds indicated by direction pointer 242. In some embodiments, playground icon 250 and corresponding direction pointer 252 represent sounds that are detected from a playground or sporting event area, and detection of sounds from wind blowing are represented by wind icon 260, and direction pointer 262 indicates that the sound is not unidirectional.

Selection indicator 270 represents an indication of the user selecting an icon displayed on display area 210 of the user's personal device. In some embodiments, the user's personal device presents the user icons representing different sounds separated from a mixture of sounds in a sound stream and enables the user to select a sound and record the sound. In one embodiment, the user's eyes are directed to and focused on one of the icons presented on display area 210. While maintaining the eye direction focus, the user performs a selection action, for example, blinking multiple times. Selection indicator 270 provides the user confirmation feedback of a selection made. If the user determines the icon selected was unintended, the user can direct eye focus to undo icon 280 to remove the current selection and make another.

Figure 3:
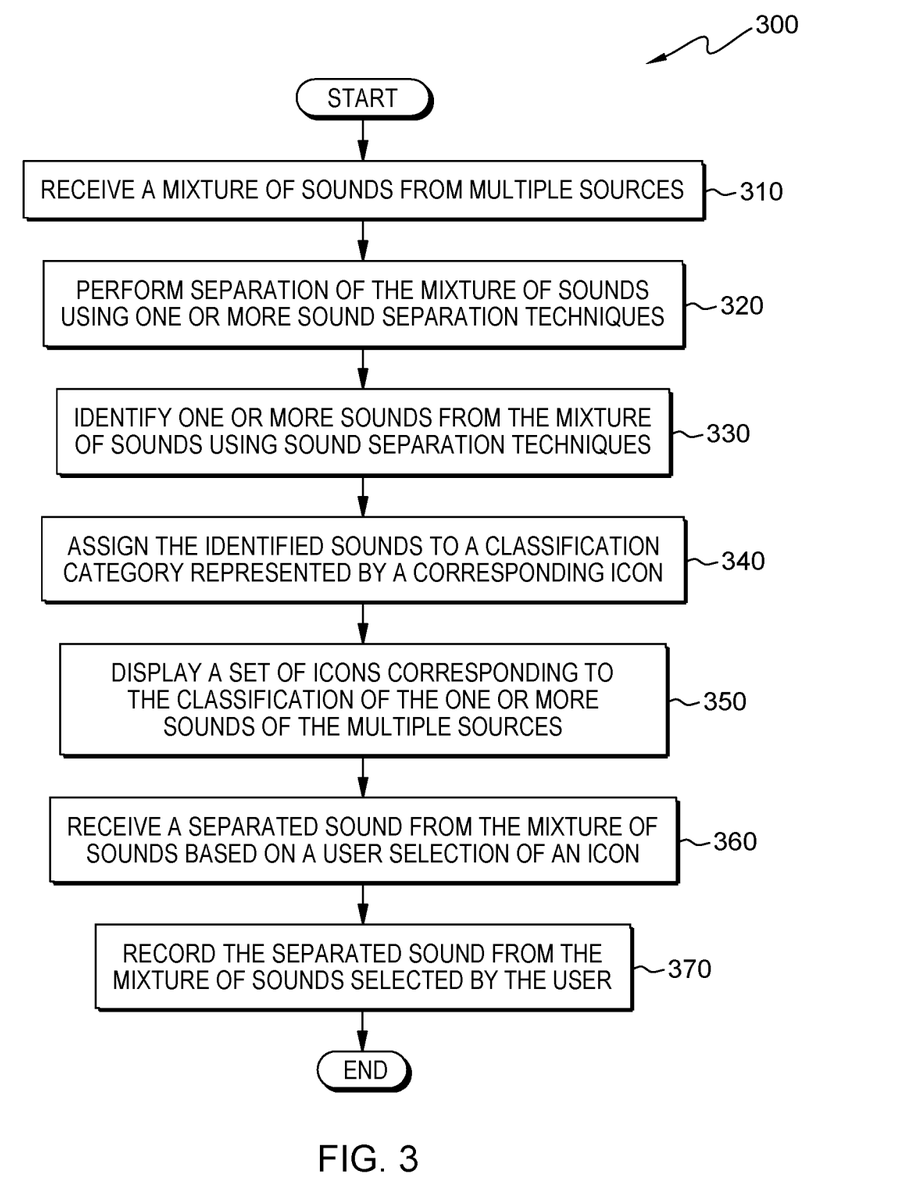
FIG. 3 is a flowchart depicting the operational steps of a sound selection program operating in the distributed data processing environment of FIG. 1, in accordance with embodiments of the present invention.

FIG. 3 is a flowchart depicting the operational steps of sound selection program 300 operating in distributed computer processing environment 100 of FIG. 1, in accordance with embodiments of the present invention. Embodiments of the present invention include a user's personal device on which sound selection program 300 operates. Sound selection program 300 enables a user's properly configured personal device to receive a mixture of sounds in a sound stream, perform sound separation functions and categorize the separated sounds and presenting an icon corresponding to the classification to a display component of the user's device. Sound separation program 300 enables the user to select a sound, perform the recording of the separated sound, and adjust properties of the sound recording.

In some embodiments, the user's personal device is a smartphone or a smart device (i.e., smartwatch) configured to receive a sound stream mixture of sounds and perform sound separation and sound localization functions on the received sounds. In other embodiments, the user's personal device is a pair of AR glasses configured with computational function and features to operate sound selection program 300 and record selected separated sounds. In other embodiments, sound selection program 300 is included in and operates from other wearable devices. For purposes of clarity in describing the function and steps of sound selection program 300, the user's personal device will be referred to as a properly configured set of AR glasses, acknowledging that the user's personal device is not limited to AR glasses.

Sound selection program 300 receives a mixture of sounds from multiple sources (step 310). Sound selection program 300 receives the mixture of sounds from microphones connected to the AR glasses of the user. The mixture of sounds includes multiple sounds from respective multiple sources that are perceived as blended into a single sound stream. The microphones that detect the sound stream are positioned on the AR glasses to enable a determination of sound localization including the direction of a sound source and potentially distance of the sound source, based on sound signal relative amplitude.

For example, sound selection program 300 receives a sound stream detected from microphones positioned on the arms of AR glasses, such as microphones 124 of AR glasses 120 of FIG. 1. Sound selection program 300 receives the sound stream determined to include multiple distinct sounds from respective multiple sources.

Sound selection program 300 performs separation of the mixture of sounds using sound separation techniques (step 320). Sound selection program 300 applies sound localization and sound separation techniques and algorithms to the received sound stream to perform separation of the multiple sounds from multiple sources. In some embodiments, the sound separation techniques utilize time-frequency methods detecting temporal regularities in the mixed audio input. In some embodiments, sound separation techniques include temporal coherence, emitting coherently modulated features as patterns of a sound source. In some embodiments, sound localization determines a direction of a sound separated from the mixture of sounds by determining the time delay in receiving the sound signals between two or more microphones of the AR glasses.

For example, sound selection program 300 applies sound separation techniques to the received sound stream and determines at least four component sounds included within the sound stream. In some embodiments, as a sound source is separated from other sounds of the sound mixture, sound selection program determines the direction of the sound and associates the direction with a magnetic compass heading so relative direction can be displayed, regardless of the direction the user wearing the AR glasses is facing.

Sound selection program 300 identifies the one or more sounds separated from the mixture of sounds (step 330). In some embodiments of the present invention, sound selection program 300 includes machine learning training to identify sound types that are separated from a mixture of sounds and assign an identified sound to a classification category. In an example embodiment, sound selection program 300 is trained using supervised learning techniques that include various previously recorded sounds, provided at various volume levels, and subsequent to individually presenting a sound, presenting the sound with additional background and interfering sounds. In some embodiments, the training of sound selection program 300 enables sound recognition of a specific sound source or "type of sound" (i.e., motorized vehicle). In some embodiments, the training of sound separation program 300 includes speech recognition, enabling sound selection program 300 to distinguish separate speakers, and in some cases with sufficient training, identify speakers.

For example, sound separation program 300 has received machine learning training using bird sounds, car sounds, and sounds of people speaking and sounds from a playground, among others. The training results in the recognition of these sounds or sounds closely resembling these sounds. Having separated a sound from a mixture of sounds in a received sound stream, sound selection program 300 determines the separated sound most closely matches a bird sound.

Sound separation program 300 assigns the identified sound to a classification category represented by a corresponding icon (step 340). Having identified a sound separated from the mixture of sounds in the sound stream, sound selection program 300 determines a category that most closely matches the identified sound and assigns the identified sound to the category that is represented by a corresponding icon. In some embodiments, the categories in which sounds are classified and the corresponding icons are selected and input by a user during machine learning training of sound selection program 300 operating in the AR glasses.

For example, sound selection program 300, having identified a separated sound from the received sound stream as a bird sound, classifies the bird sound in the category of nature sounds, which is represented by the corresponding icon of a tree image.

Sound selection program 300 displays a set of icons corresponding to the classifications of the identified sounds (step 350). The identified sounds of the mixture of sounds of the sound stream are associated with respective icons corresponding to classification categories and are presented to the user on the display area of the AR glasses. Sound selection program 300 renders an icon on the display area of the AR glasses for each of the separated sounds of the sound stream. In some embodiments in which a larger number of separated sounds are identified and assigned a category icon, sound selection program 300 may display a limited number of icons at one time on the display area of the AR glasses, with a paging selection to display the next set of icons to be considered by the user. In some embodiments, the displayed icons also include a directional pointer indicating the direction in which the separated sound is detected.

For example, having identified a separated sound of the mixture of sounds received as a bird's sound categorized as a sound of nature and represented by a corresponding icon of a tree, sound selection program 300 presents the tree icon on the display area of AR glasses worn by the user. By presenting the tree icon, sound selection program 300 enables the user of the AR glasses to select the icon corresponding to the bird's sound.

Sound selection program 300 records the separated sound from the mixture of sounds, based on a selection by the user (step 370). The user of the AR glasses is presented a set of icons on the display area of the AR glasses and each icon corresponds to a different sound separated from the received sound stream. The user of the AR glasses makes a selection of an icon from the displayed set of icons, which initiates recording of the separated sound associated with the selected icon. In some embodiments, sound selection program 300 includes a tiered structure of icons representing a category and subcategories of separated sounds, for example, at a social gathering of multiple people speaking in which an initial icon represents the category of "people's speech", and a subcategory may include three distinct icons representing a group of three people in a conversation.

For example, sound selection program 300 presents a set of icons on display area 125 of AR glasses 120 (FIG. 1) with each icon representing a distinct separated sound from the sound stream. The user of AR glasses 120 views the set of icons and focuses eye direction on a tree icon associated with the category of nature sounds. The user performs a selection action, such as blinking quickly multiple times while maintaining eye focus on the tree icon, and sound selection program 300 presents a confirmation message for initiating recording of the separated sound associated with the tree icon on display area 125 of AR glasses 120. The user performs the selection action confirming recording, and sound selection program 300 initiates the recording of the separated sound associated with the tree icon.

In some embodiments, sound selection program 300 continues to learn as the user of the AR glasses performs multiple recording acts and displays icons associated with sound categories that the user of the AR glasses has preferred in a more prominent priority position on the display area of the AR glasses. In some embodiments, a separated sound that is not identified by sound selection program 300 is assigned an icon corresponding to an "unknown" status, such as a question mark, and provides the user an opportunity to classify the sound and associate an existing icon or assign a new icon to the sound.

Having recorded the selected separated sound, sound selection program 300 ends.

Figure 4:
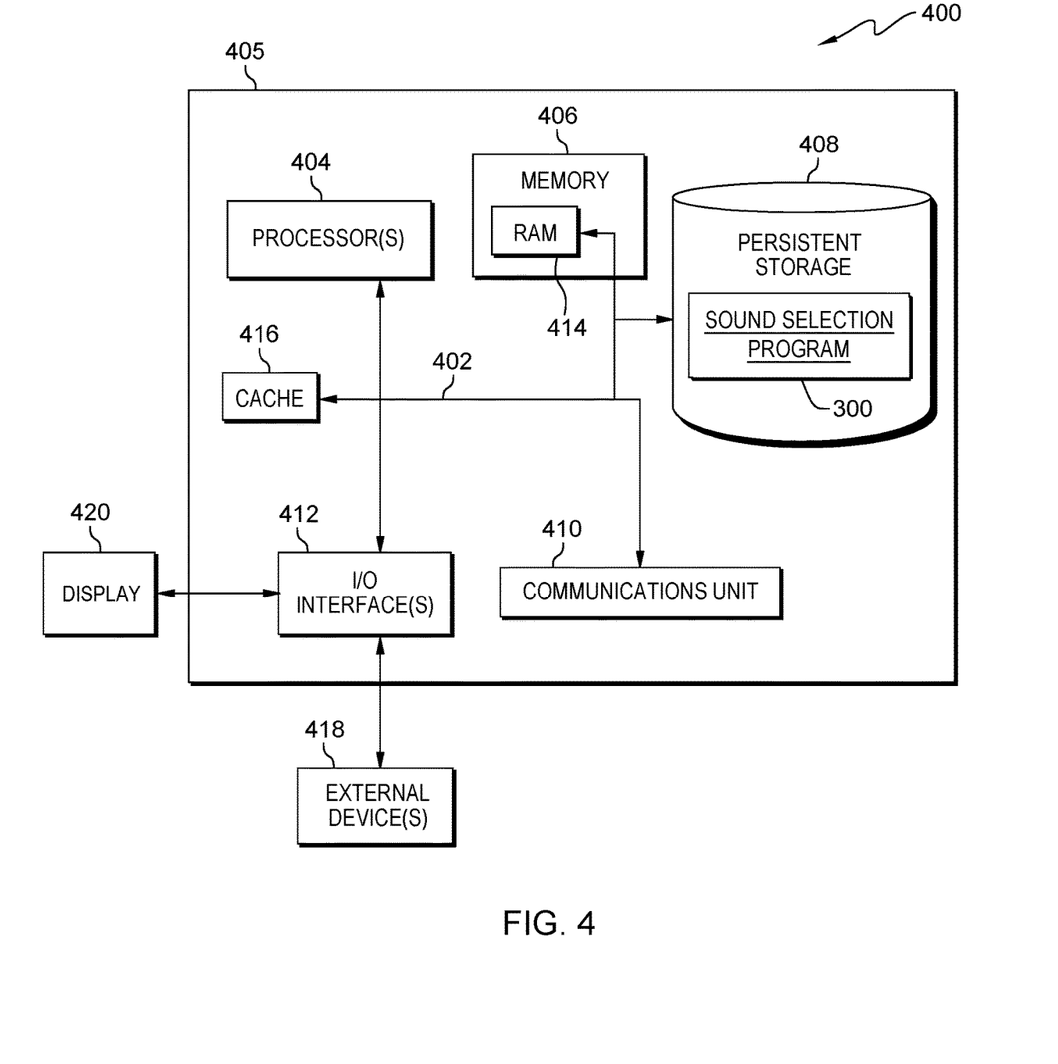
FIG. 4 depicts a block diagram of components of a computing system, including a computing device configured to operationally perform the sound selection program of FIG. 3, in accordance with an embodiment of the present invention.

FIG. 4 depicts a block diagram of components of computing system 400, including computing device 405, configured to include or operationally connect to components depicted in FIG. 1, and with the capability to operationally perform sound selection program 300 of FIG. 2, in accordance with an embodiment of the present invention.

Computing device 405 includes components and functional capability similar to components of computing device 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment sound selection program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Sound selection program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., sound selection program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or the other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selectively recording one or more sounds from a multiple-sound environment, the method comprising:
   receiving, by one or more processors, a mixture of sounds from multiple sources;
   performing, by the one or more processors, a separation of the mixture of sounds by applying one or more sound separation techniques;
   identifying, by the one or more processors, one or more sounds of the mixture of sounds from the multiple sources, based on training using machine learning techniques;
   generating, by the one or more processors, a set of icons corresponding respectively to a classification assigned to respective identified sounds of the mixture of sounds from the multiple sources;
   receiving, by the one or more processors, a selection of a first icon of the generated set of icons associated with the sound, based on an action by a user selecting the first icon; and
   recording, by the one or more processors, the sound from the mixture of sounds from the multiple sources associated with the first icon selected by the user.

2. The method of claim 1, further comprising:
   receiving, by the one or more processors, the mixture of sounds utilizing two or more microphones; and
   displaying, by the one or more processors, the set of icons on a user interface of a personal device of the user, wherein the personal device of the user is augmented reality (AR) glasses configured to record and store recorded sounds.

3. The method of claim 1, further comprising:
   receiving, by the one or more processors, the mixture of sounds utilizing two or more microphones; and
   displaying, by the one or more processors, the set of icons on a user interface of a personal device of the user, wherein the personal device of the user is a smart device configured to record and store recorded sounds.

4. The method of claim 1, wherein a set of parameters associated with recording the sound from the mixture of sounds selected by the action of the user selecting the first icon of the displayed set of icons associated with the mixture of sounds, are controlled by the user selecting displayed options.

5. The method of claim 1, wherein an icon of the set of icons corresponds to a category classification.

6. The method of claim 1, wherein the user alters a property of the sound from the mixture of sounds while recording the sound, and wherein the property of the sound includes attributes of volume, sound pitch, and speed of recording.

7. The method of claim 1, wherein the machine learning techniques include supervised learning in which a plurality of distinct audio sounds is delivered along with identification of the distinct audio sounds.

8. A computer program product for selectively recording one or more sounds from a multiple-sound environment, the computer program product comprising:
   one or more computer-readable storage media, and program instructions stored on the one or more computer-readable storage media, the program instructions comprising:
   program instructions to receive mixture of sounds from multiple sources;
   program instructions to perform a separation of the mixture of sounds by applying one or more sound separation techniques;
   program instructions to identify one or more sounds of the mixture of sounds from the multiple sources, based on training using machine learning techniques;
   program instructions to generate a set of icons corresponding respectively to a classification assigned to respective identified sounds of the mixture of sounds from the multiple sources;
   program instructions to receive a selection of a first icon of the generated set of icons associated with the sound, based on an action by a user selecting the first icon; and
   program instructions to record the sound from the mixture of sounds from the multiple sources associated with the first icon selected by the user.

9. The computer program product of claim 8, further comprising:
   program instructions to receive the mixture of sounds by two or more microphones; and
   program instructions to display the set of icons on a user interface of a personal device of the user, wherein the personal device of the user is augmented reality (AR) glasses configured to record and store recorded sounds.

10. The computer program product of claim 8, further comprising:
    program instructions to receive the mixture of sounds by two or more microphones; and
    program instructions to display the set of icons on a user interface of a personal device of the user, wherein the personal device of the user is a smart device configured to record and store recorded sounds.

11. The computer program product of claim 8, wherein a set of parameters associated with recording the sound from the mixture of sounds selected by the action of the user selecting the first icon of the displayed set of icons associated with the mixture of sounds, are controlled by the user selecting displayed options.

12. The computer program product of claim 8, wherein the user alters a property of the sound from the mixture of sounds while recording the sound, and wherein the property of the sound includes attributes of volume, sound pitch, and speed of recording.

13. The computer program product of claim 8, wherein the machine learning techniques include supervised learning in which a plurality of distinct audio sounds is delivered along with identification of the distinct audio sounds.

14. A computer system for selectively recording one or more sounds from a multiple-sound environment, the computer system comprising:
 one or more computer processors;
 one or more computer-readable storage media, and program instructions stored on the one or more computer-readable storage media, the program instructions comprising:
  program instructions to receive mixture of sounds from multiple sources;
  program instructions to perform a separation of the mixture of sounds by applying one or more sound separation techniques;
  program instructions to identify one or more sounds of the mixture of sounds from the multiple sources, based on training using machine learning techniques;
  program instructions to generate a set of icons corresponding respectively to a classification assigned to respective identified sounds of the mixture of sounds from the multiple sources;
  program instructions to receive a selection of a first icon of the generated set of icons associated with the sound, based on an action by a user selecting the first icon; and
  program instructions to record the sound from the mixture of sounds from the multiple sources associated with the first icon selected by the user.

15. The computer system of claim 14, further comprising:
 program instructions to receive the mixture of sounds by two or more microphones; and
 program instructions to display the set of icons on a user interface of a personal device of the user, wherein the personal device of the user is augmented reality (AR) glasses configured to record and store recorded sounds.

16. The computer system of claim 14, further comprising:
 program instructions to receive the mixture of sounds by two or more microphones; and
 program instructions to display the set of icons on a user interface of a personal device of the user, wherein the personal device of the user is a smart device configured to record and store recorded sounds.

17. The computer system of claim 14, wherein a set of parameters associated with recording the sound from the mixture of sounds selected by the action of the user selecting the first icon of the displayed set of icons associated with the mixture of sounds, are controlled by the user selecting displayed options.

18. The computer system of claim 14, wherein an icon of the set of icons corresponds to a category classification.

19. The computer system of claim 14, wherein program instructions altering a property of the sound from the mixture of sounds while recording the sound is based on program instructions of a selected option received from the user, and wherein the property of the sound includes attributes of volume, sound pitch, and speed of recording.

20. The computer system of claim 14, wherein the program instructions to identify the one or more sounds based on training using machine learning techniques includes programming instructions to:
 apply machine learning techniques that include supervised learning in which a plurality of distinct audio sounds is delivered along with identification of the distinct audio sounds.

* * * * *